US005371346A

United States Patent [19]

Menoud

[11] Patent Number: 5,371,346

[45] Date of Patent: Dec. 6, 1994

[54] PROGRAMMABLE CARD ACTUATED APPARATUS FOR VENDING NEWSPAPERS

[75] Inventor: Edouard Menoud, Plan-les-Ouates, Switzerland

[73] Assignee: Inventio AG, Hergiswil NW, Switzerland

[21] Appl. No.: 100,666

[22] Filed: Jul. 30, 1993

[30] Foreign Application Priority Data

Jul. 31, 1992 [CH] Switzerland .................... 02416/92-7

[51] Int. Cl.$^5$ ................................................ G06K 7/06

[52] U.S. Cl. .................................... 235/381; 235/441; 235/492

[58] Field of Search ................ 235/380, 492, 381, 441

[56] References Cited

U.S. PATENT DOCUMENTS

| | | | |
|---|---|---|---|
| 3,851,314 | 11/1974 | Hedin | 235/441 |
| 3,906,201 | 9/1975 | Housman et al. | 235/441 |
| 3,928,750 | 12/1975 | Wolflingseder | 235/441 |
| 4,389,564 | 6/1983 | Flair et al. | 235/489 |
| 4,654,513 | 3/1987 | Hennessy | 235/381 |
| 4,758,718 | 7/1988 | Fujisaki et al. | 235/492 X |
| 4,802,218 | 1/1989 | Wright et al. | 235/492 X |
| 4,994,659 | 9/1991 | Yabe | 235/492 |

FOREIGN PATENT DOCUMENTS

| | | | |
|---|---|---|---|
| 0351335 | 1/1990 | European Pat. Off. . | |
| 2509857 | 9/1976 | Germany | 235/492 |
| 3441099 | 9/1985 | Germany . | |
| 3425524 | 1/1986 | Germany . | |
| 606688 | 4/1971 | Switzerland . | |

*Primary Examiner*—John Shepperd
*Attorney, Agent, or Firm*—Howard & Howard

[57] ABSTRACT

An automatic vending machine for articles such as newspapers has a housing with a card slot for the insertion of a subscriber card into a card reader in the housing to read information from the card. The card reader is connected to a programmable computer which controls an article delivery apparatus to deliver a newspaper from a delivery slot in the housing. The subscriber card has an electrically conductive encodable contact array formed thereon for providing the information necessary to actuate the article delivery apparatus. The array includes a plurality of contact pads and a contact bridge formed of copper foil, for example. At least one of the contact pads is connected to the contact bridge and the card reader has a plurality of reeds for contacting the contact pads to read the encoded information into the computer.

18 Claims, 2 Drawing Sheets

PROGRAMMABLE CARD ACTUATED APPARATUS FOR VENDING NEWSPAPERS

BACKGROUND OF THE INVENTION

The present invention relates generally to an apparatus for automatically vending articles and, in particular, to a programmable card actuated apparatus for vending newspapers and the like.

Automatic vending machines which dispense stored articles and are controlled by cards having programmable data carriers are known. In addition, such cards can be used to access the interior of the machines for servicing and maintenance.

The U.S. Pat. No. 4,654,513 shows an automatic vending machine for flat materials such as newspapers. The stack of newspapers is inclined and that position is maintained by a vertical back wall and a telescopically acting rod device. For the delivery of a newspaper, a motor drives gearing which is connected with the rod device, whereby the downward moving rod device releases the uppermost newspaper in the stack, which newspaper under the influence of gravity slides from the stack and drops into a delivery slot. The movement of the motor is controlled by control and memory units which are connected with a magnetic card reader. Data, such as machine codes, subscriber codes, number of deliveries per subscriber and day, as well as specific delivery dates, are transferred to the control and memory units with the aid of a magnetic card which can be read by the card reader.

A drawback of this machine is that, for certain applications, the varied capabilities of the cards cannot be used. Thus, the cost/profit ratio is so high that the use of such cards in large quantities becomes economically unfeasible.

SUMMARY OF THE INVENTION

The present invention concerns an automatic vending machine for articles such as newspapers including a housing with an interior enclosed by walls for storing a plurality of articles to be dispensed; an article delivery apparatus mounted in the housing; a programmable computer mounted in the housing and connected to the article delivery apparatus; and a card reader mounted in the housing adjacent a card slot formed in one of the walls, the card reader being connected to the computer and having a plurality of reeds for reading information from a card inserted into the card slot. A subscriber card has a generally planar body with at least one generally flat surface on which is formed an encodable contact array for providing information. The contact array has a plurality of contact pads and a contact bridge of electrically conductive material formed on the flat surface, each of the contact pads being positioned to contact a corresponding one of the reeds in the card reader, at least one of the contact pads being electrically connected to the bridge for generating encoded information when the body is inserted in the card slot to control the computer and the article delivery apparatus to deliver an article from the housing. The computer responds to the encoded information by delaying a predetermined time interval between two deliveries of an article from said housing.

The contact array includes a base contact pad connected to the contact bridge, a first contact pad, a second contact pad, a third contact pad, a fourth contact pad, a fifth contact pad, a sixth contact pad and a seventh contact pad with the base contact pad and the first through third contact pads being positioned in one row and the fourth through seventh contact pads being positioned in another row generally parallel to the one row. At least one of the first through third contact pads is connected to the contact bridge and at least one of the fourth through seventh contact pads is connected to the contact bridge. Each of the contact pads connected to the contact bridge can provide encoded information in the form of a binary "1" and each of the contact pads not connected to the contact bridge can provide encoded information in the form of a binary "0". The contact array can formed of copier foil material.

The present invention solves the problem of the drawback of the known devices by making available to the subscribers a card with simplified functions and which can be produced with the simplest means and at minimal cost.

An advantage of the present invention is that the subscriber card makes large-scale promotion campaigns cost-efficient.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
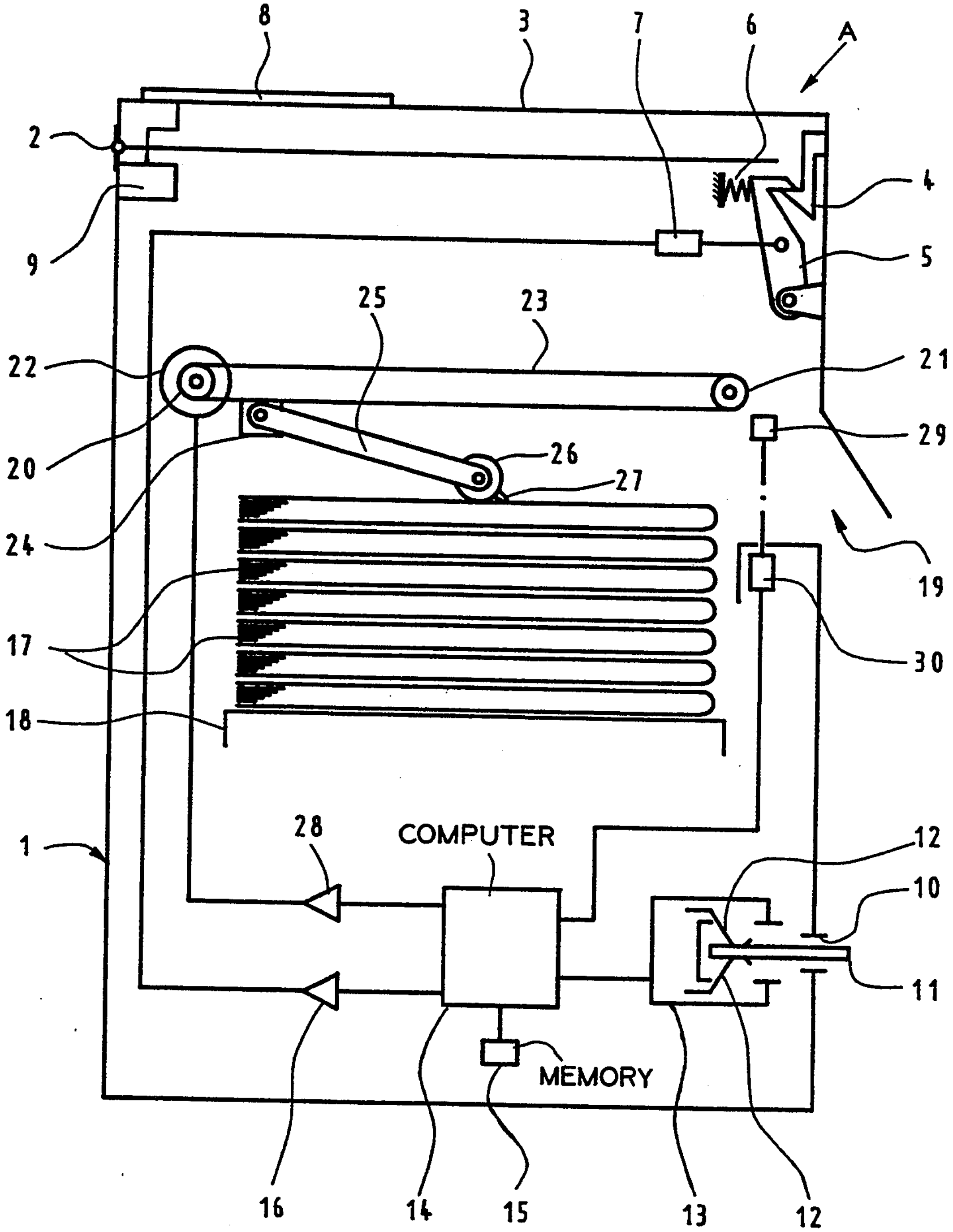
FIG. 1 is a schematic cross-sectional view through a portion of an automatic vending machine actuated by a subscriber card in accordance with the present invention.

An automatic vending machine A for dispensing articles such as newspapers in response to the insertion of a valid subscriber card is shown in the FIG. 1. The machine A includes a box-like housing 1 having an open top side which is closed by a cover 3 attached to the housing 1 by a hinge 2 connected between adjacent rear edges of the housing and the cover. In the generally horizontal position shown, the open top side of the housing 1 is securely closed by the cover 3. Mounted on an interior surface of a front edge of the cover 3 is a hook 4 which, in the closed position, engages a catch 5 pivotally attached to an upper interior surface of a front wall of the housing 1. The catch 5 is loaded by a spring 6 mounted in the housing 1 into a locked position to maintain the cover 3 securely closed as shown. The catch 5 can be pulled into an unlocked or released position by an electromagnet 7 mounted in the housing 1. Mounted on an exterior surface of the cover 3 is a photovoltaic element 8 which is electrically connected to a power supply 9 mounted inside the housing 1. The element 8 charges the power supply 9 which provides electrical power to various devices in the housing 1.

Formed in a front wall of the housing 1 is a generally horizontally extending aperture or card slot 10 for receiving a subscriber card 11. The card 11 has a generally planar body with opposed flat surfaces. A portion of the subscriber card 11 inserted into the slot 10 has contact pads (see FIG. 2) formed on one or both of the surfaces thereof to contact a plurality of electrically conductive reeds 12 of a card reader 13 mounted in the housing 1. The card reader 13 is connected to a first input of a programmable computer 14 which computer also is connected to a memory 15. The computer 14 has a first output connected through a first amplifier 16 to the electromagnet 7. A plurality of newspapers or periodicals 17 are stacked on a height-adjustable horizontally extending platform 18 located inside the housing 1. The platform 18 can, for example, be guided and adjusted in height so that the uppermost newspaper 17 of the stack is always located at the same height in the housing 1. The newspapers 17 are dispensed from a delivery slot 19 as discussed below.

A pair of toothed pulleys 20 and 21 are rotatably supported at the rear and front respectively of the interior of the housing 1. The pulley 20 is connected to the power take-off shaft of a reversible motor 22 mounted inside the housing 1. An endless toothed belt 23 is stretched over the pulleys 20 and 21 such that rotation of the pulley 20 by the motor 22 will rotate the pulley 21. Attached to a lower portion of the toothed belt 23 adjacent to the pulley 20 is a bracket 24 to which one end of an arm 25 is pivotally attached. Rotatably supported on a free end of the arm 25 is a roller 26 which rests on the upwardly facing surface of the top one of the newspapers 17. In the rearward limit position shown, one or more prongs 27 protrude from the roller 26 in a forward and downward direction. A second output of the computer 14 is connected to the motor 22 through a second amplifier 28 for switching the motor on and off. When the computer 14 switches on the motor 22, the pulley 20 is rotated in a counterclockwise direction to drive the arm 25 toward the front wall of the housing 1. The forward movement of the arm 25 and the attached roller 26 and the prong 27 frictionally pushes the uppermost newspaper 17 out from the delivery slot 19 formed in the front wall of the housing 1.

Mounted inside the housing 1 adjacent to the delivery slot 19 is a sensor shown as light barrier having an optical transmitter 29 and an optical receiver 30 mounted respectively above and below the delivery slot 19. The receiver 30 is connected to a second input of the computer 14. This sensor signals the presence of a pushed-out one of the newspapers 17 to the computer 14. The motor 22 is switched on by the computer 14 as soon as the delivery slot 19, monitored by the optical transmitter 29 and the optical receiver 30, is clear, at least one newspaper 17 lies on the platform 18 and valid data for the delivery of a newspaper 17 has been transmitted from the card reader 13 to the computer 14.

Figure 2:
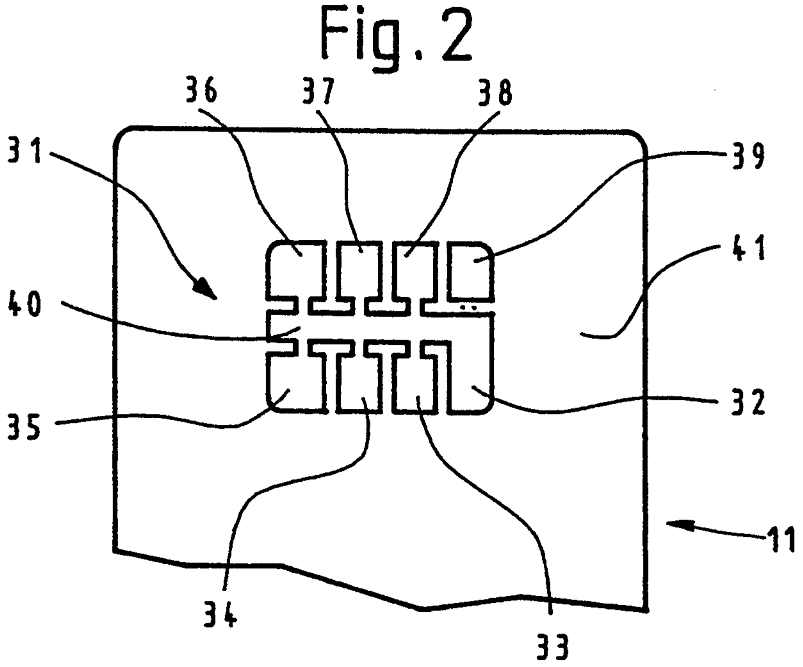
FIG. 2 is enlarged fragmentary plan view of the subscriber card shown in the FIG. 1.

A portion of the subscriber card 11 is shown in the FIG. 2 as having a contact array 31 formed on a generally planar surface 41 thereof. The contact array 31 can consist of an electrically conducting material, such as copper foil, formed with two generally parallel rows of contact pads, an upper row and a lower row, each of the contact pads being positioned to contact one of the reeds 12 in the card reader 13. A base contact pad 32 is positioned at a lower left corner of the array 31 at a right end of the lower row. A first contact pad 33, a second contact pad 34 and a third contact pad 35 are positioned in sequence to the left of the contact pad 32 to complete the lower row. A fourth contact pad 36 is positioned above the contact pad 35 at a left end of the upper row. A fifth contact pad 37, a sixth contact pad 38 and a seventh contact pad 39 are positioned in sequence to the right of the contact pad 36 to complete the upper row. In the example shown in the FIG. 2, each of the second contact pad 33 through the sixth contact pad 38 is connected to a contact bridge 40 which extends from an upper edge of the base contact pad 32 and to the left between the upper and lower rows of contact pads. Although no connection is shown between the seventh contact pad 39 and the bridge 40, such a connection could be made for use in other coding schemes.

Depending upon the coding desired, one or more of the contact pads can be disconnected from the bridge. There is shown in the FIG. 3 a schematic diagram of a plurality of coding possibilities for the contact array 31. The coding of the contact array 31 represented by the example contact pad connections illustrated in the FIG. 2 is shown as a coding schematic diagram 42 in a lower right hand corner of the FIG. 3. Each of the contact pads 33 through 38 is connected to the base contact pad 32 by the bridge 40 and the seventh contact pad 39 is not connected to the base contact pad 32.

Figure 3:
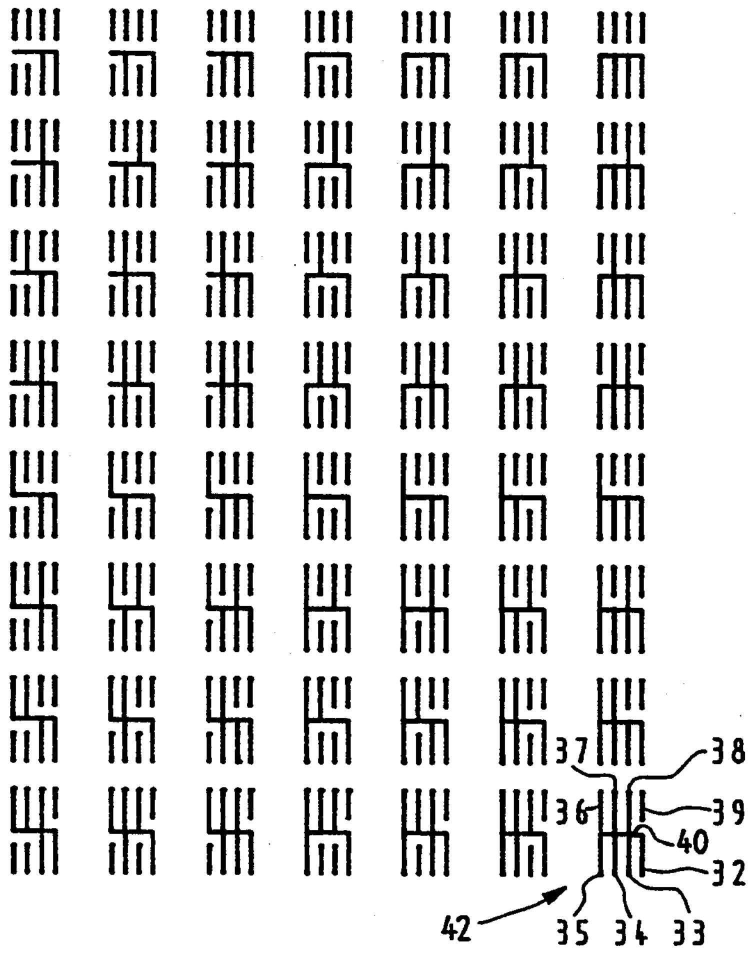
FIG. 3 is a schematic diagram of a plurality of contact array coding possibilities for the subscriber card shown in the FIG. 2.

In the FIG. 3, the first row of coding schematic diagrams illustrates the possible coding combinations when all of the upper row contact pads, the fourth contact pad 36 through the seventh contact pad 39, are not connected to the bridge 40. The last row of coding schematic diagrams illustrates the possible coding combinations when only the seventh contact pad 39 of the upper row is not connected to the bridge 40. In each of the other rows of coding schematic diagrams shown, the seventh contact pad 39 is not connected as are one or two of the other upper row contact pads. Thus, the contact array 31 can provide the fifty-six coding combinations shown in the FIG. 3. However, other coding combinations are possible using the contact array 31 and other contact arrays could be utilized.

The card 11 can be given to a user gratuitously for the purpose of promotions or sold to the user for a subscription. The card 11 entitles the user to a newspaper 17 delivered by the automatic vending machine A. Cards 11 having the coding illustrated in the FIG. 3 can be distributed for each geographical area or region where the machines A are located. Prior to a promotional campaign, a regional code is communicated to the computer 14 by a card, similar to the card 11 but having a programmable data carrier in place of the contact array 31, inserted into the slot 10. On the day of promotion, the computer 14 controls the delivery of the free newspapers in such a way that during a predetermined time period only one free newspaper 17 is delivered by the automatic vending machine A. Prior to and after the day of promotion, the computer 14 does not accept the regional code on the cards 11.

Together, the subscriber card 11 and the card reader 13 form an actuating means for controlling the delivery of an article from an automatic vending machine. The card 11 carries information in the form of the contact array 31. The information on the card 11 is transferred to the computer 14 through the reeds 12 which individually contact the contact pads of the array. If, for example, the card reader 13 applies a voltage to the base contact pad 32 through an associated one of the reeds 12, that voltage will appear only at the one or more of the contact pads connected to the contact bridge 40. Thus, the contact array 31 can represent information in binary form with a "1" being the presence of voltage and a "0" being the absence of voltage.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A subscriber card for use in an automatic vending machine for articles, the automatic vending machine having a housing with an interior for storing a plurality of articles to be dispensed, a card slot formed in a wall of the housing for the insertion of a card into a card reader mounted in the housing, the card reader having a plurality of reeds for contacting the card and being connected to a computer for reading information from the card, the computer being connected to an article delivery means and being responsive to the information read from the card for controlling the article delivery means to deliver the articles through a delivery slot formed in the housing, the subscriber card comprising:
- a generally planar body having at least one generally flat surface;
- an electrically conductive contact bridge formed on said flat surface;
- an electrically conductive base contact pad formed on said flat surface and electrically connected to said contact bridge; and
- a plurality of electrically conductive contact pads formed on said flat surface, at least one of said contact pads being electrically connected to said contact bridge whereby said base contact pad and said plurality of contact pads form an encodable contact array, each of said base contact pad and said plurality of contact pads being positioned to contact a corresponding reed in a card reader of an automatic vending machine for generating encoded information when said body is inserted in the card reader to control the delivery of an article from the automatic vending machine.

2. The subscriber card according to claim 1 wherein said contact array provides said encoded information for controlling a time interval between two deliveries of an article from the automatic vending machine.

3. The subscriber card according to claim 1 wherein said plurality of contact pads includes a first contact pad, a second contact pad, a third contact pad, a fourth contact pad, a fifth contact pad, a sixth contact pad and a seventh contact pad, said base contact pad and said first through said third contact pads being positioned in one row, said fourth through said seventh contact pads being positioned in another row generally parallel to said one row and said contact bridge being positioned between said one row and said another row.

4. The subscriber card according to claim 1 wherein said contact bridge, said base contact pad and said contact pads are formed of copper foil material.

5. The subscriber card according to claim 1 wherein each of said contact pads connected to said contact bridge provides encoded information in the form of a binary "1" and each of said contact pads disconnected from said contact bridge provides encoded information in the form of a binary "0".

6. In an automatic vending machine for articles having a housing with an interior for storing a plurality of articles to be dispensed, a card slot formed in a wall of the housing for the insertion of a card into a card reader mounted in the housing, the card reader having a plurality of reeds for contacting the card and being connected to a computer for reading information from the card, the computer being connected to an article delivery apparatus and being responsive to the information read from the card for controlling the article delivery apparatus to deliver the articles through a delivery slot formed in the housing, an actuating means comprising:
- a card reader having a plurality of electrically conductive reeds, said card reader being mounted in an automatic vending machine and being connected to a computer and an article delivery apparatus in the machine:
- a subscriber card having a generally planar body with at least one generally flat surface; and
- an encodable contact array formed on said flat surface for providing information, said contact array having a plurality of contact pads and a contact bridge of electrically conductive material formed on said flat surface, each of said contact pads being positioned to contact a corresponding one of said reeds in said card reader, at least two of said contact pads being electrically connected to said contact bridge whereby said contact array generates encoded information when said body is inserted in said card reader with said contact pads engaging corresponding ones of said reeds to control the delivery of an article from the automatic vending machine.

7. The actuating means according to claim 6 wherein said contact array provides said encoded information for controlling a time interval between two deliveries of an article from the automatic vending machine.

8. The actuating means according to claim 6 wherein said contact array includes a base contact pad connected to said contact bridge, a first contact pad, a second contact pad, a third contact pad, a fourth contact pad, a fifth contact pad, a sixth contact pad and a seventh contact pad, said base contact pad and said first through said third contact pads being positioned in one row, said fourth through said seventh contact pads being positioned in another row generally parallel to said one row and said contact bridge being positioned between said one row and said another row.

9. The actuating means according to claim 6 wherein said contact array is formed of copper foil material.

10. The actuating means according to claim 6 wherein at least another one of said contact pads is electrically disconnected from said contact bridge.

11. The subscriber card according to claim 6 wherein one of said contact pads electrically connected to said contact bridge is a base contact pad, each other one of said contact pads connected to said contact bridge provides encoded information in the form of a binary "1" and each other one of said contact pads disconnected from said contact bridge provides encoded information in the form of a binary "0".

12. An automatic vending machine for articles comprising:
- a housing with an interior enclosed by walls for storing a plurality of articles to be dispensed;
- an article delivery apparatus mounted in said housing;
- a programmable computer mounted in said housing and connected to said article delivery apparatus;
- a card reader mounted in said housing adjacent a card slot formed in one of said walls, said card reader being electrically connected to said computer and having a plurality of reeds for reading information from a card inserted into said card slot; and
- a subscriber card having a generally planar body with at least one generally flat surface on which is formed an encodable contact array for providing information, said contact array having a plurality of contact pads and a contact bridge of electrically conductive material formed on said flat surface, each of said contact pads being positioned to contact a corresponding one of said reeds when said card is inserted in said card reader, at least two of said contact pads being electrically connected to and at least another one of said contact pads being electrically disconnected from said contact bridge for generating encoded information when said body is inserted in said card slot and said contact pads engage said corresponding reeds to control said computer and said article delivery apparatus to deliver articles from said housing.

13. The automatic vending machine according to claim 12 wherein said computer responds to said encoded information by delaying a predetermined time interval between two deliveries of an article from said housing.

14. The automatic vending machine according to claim 12 wherein said contact array includes a base contact pad, a first contact pad, a second contact pad, a third contact pad, a fourth contact pad, a fifth contact pad, a sixth contact pad and a seventh contact pad, said base contact pad and said first through said third contact pads being positioned in one row, said fourth through said seventh contact pads being positioned in another row generally parallel to said one row and said contact bridge being positioned between said one row and said another row.

15. The automatic vending machine according to claim 14 wherein said base contact pad is connected to said contact bridge.

16. The automatic vending machine according to claim 14 wherein said seventh contact pad is disconnected from said contact bridge.

17. The automatic vending machine according to claim 12 wherein one of said contact pads electrically connected to said contact bridge is a base contact pad, each other one of said contact pads connected to said contact bridge provides encoded information in the form of a binary "1" and each other one of said contact pads disconnected from said contact bridge provides encoded information in the form of a binary "0".

18. The automatic vending machine according to claim 12 wherein said contact array is formed of copper foil material.

* * * * *